(No Model.)
T. A. EDISON.
REGULATOR FOR DRIVING ENGINES OF ELECTRICAL GENERATORS.
No. 273,491. Patented Mar. 6, 1883.
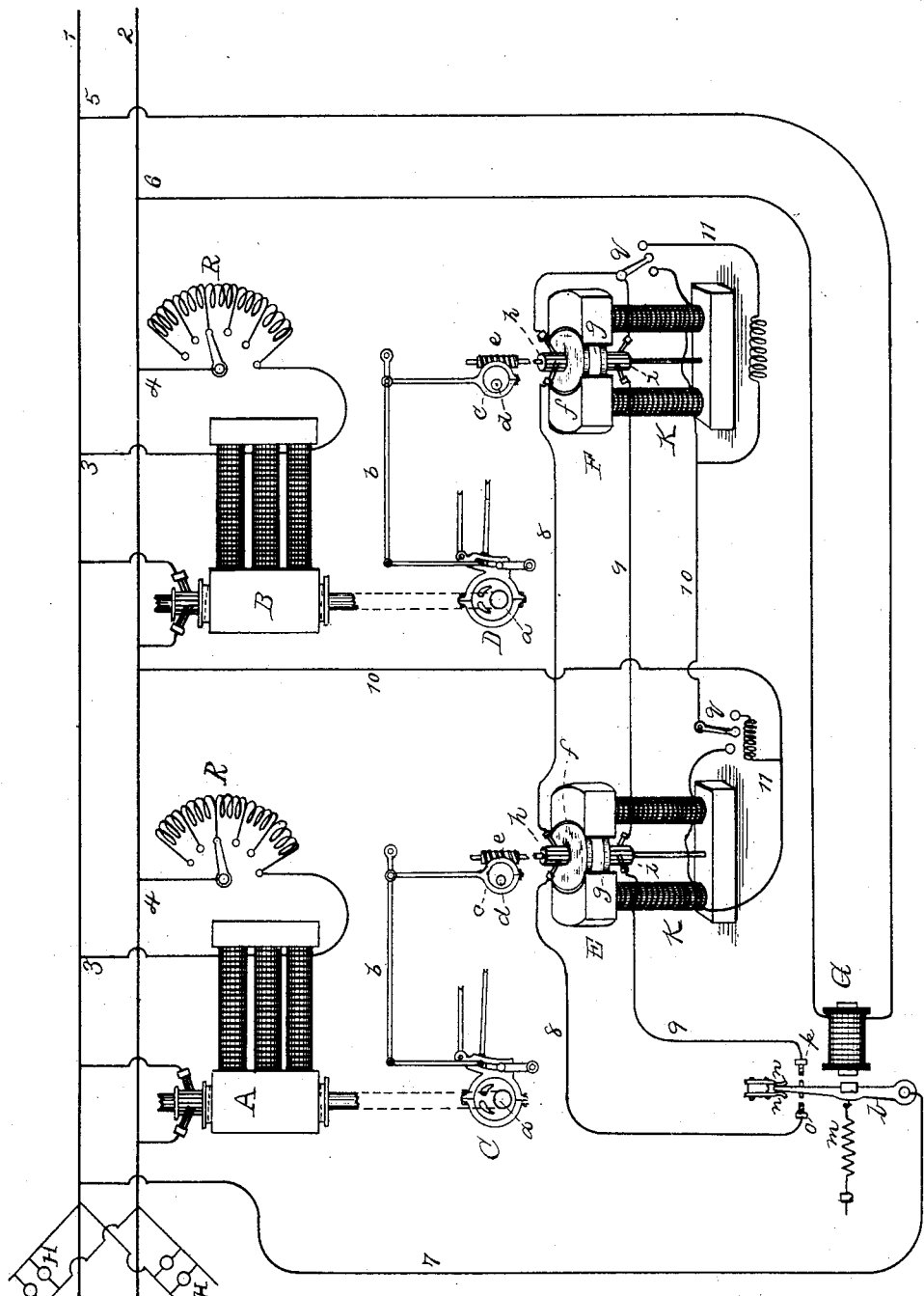
ATTEST:
E. C. Rowland
INVENTOR:
Thomas A. Edison,
By Rich'd N. Dyer,
Atty.

UNITED STATES PATENT OFFICE.

THOMAS A. EDISON, OF MENLO PARK, NEW JERSEY.

REGULATOR FOR DRIVING ENGINES OF ELECTRICAL GENERATORS.

SPECIFICATION forming part of Letters Patent No. 273,491, dated March 6, 1883.

Application filed October 26, 1882. (No model.)

*To all whom it may concern:*

Be it known that I, THOMAS A. EDISON, of Menlo Park, in the county of Middlesex and State of New Jersey, have invented a new and useful Improvement in Means for Operating Electrical Generators, (Case No. 490,) of which the following is a specification.

In any system of electric distribution wherein dynamo or magneto electric machines feed into the same conductors or system of conductors, and are operated by two or more separate steam-engines or other motors, difficulty is experienced on account of variations in the speed of the engines.

In my application No. 488, (Serial No. 74,096,) I have shown and particularly described means for mechanically connecting the governors controlling the throttle-valves or cut-offs of all the engines, so that such governors will work together and will not be allowed to jump or vibrate independently of each other, a uniform speed of all the engines being thereby preserved.

The object of the present invention is to accomplish this end by mechanism operated or controlled electrically.

In carrying out my invention I substitute for the centrifugal governors, which are affected indirectly by the load of the engines, electrical governors, which are controlled by the current generated, and hence are affected directly by the conditions of the circuit and the load of the engines. All the governors are controlled by the current of the circuit into which the generators feed, and hence move in unison. The electrical governors are also preferably operated by the current from this circuit, although they may be operated by current from any other source.

In the preferred form of the apparatus, I connect with the throttle-valve or cut-off mechanism of each engine (the latter preferably) the spindle of an electro-dynamic motor. The circuit of these motors is controlled by an electromagnet located in a multiple-arc circuit from the conductors with which the generators are connected, such magnet being affected exactly as are the lamps, motors, or other translating devices, which are also arranged in multiple arc. The armature lever of this magnet is provided with an adjustable retractor, and it has its central position determined by means of springs between which it is balanced. In order to avoid the use of a current-reverser, each motor has two armatures, with reverse windings or connections, one armature of each motor being brought into circuit when the armature-lever of the controlling electro-magnet makes its front contact, adjusting the throttle-valves or cut-off mechanisms of all the engines simultaneously and to the same extent in one direction, and the other armature of each motor being brought into circuit when said lever makes its back contact, adjusting the throttle-valves or cut-off mechanisms of all the engines in the opposite direction. If electro-dynamic motors with one armature each are used, a current-reverser worked by the controlling electro-magnet will be employed.

The broad invention of the electro-dynamic motor having two armatures with reverse windings will be made the subject of another application for patent.

Means are employed for cutting each motor out of circuit when the engine it governs is not running. This can be done by a switch, breaking the field-circuit of the motor and closing another circuit having a resistance equal to that of the field-magnet coils; or, the motor may be disconnected mechanically from the engine and allowed to run with the other motors.

Each generator is provided with means for varying its electro-motive force, as required, by the addition and removal of translating devices, the electrically-controlled governors being employed to adjust the engines to meet the load and to secure uniformity of speed. The means for varying the electro-motive force of each generator, as required by the addition or removal of translating devices, may be an adjustable resistance in its field-circuit.

In the accompanying drawing is shown a view of part of the cut-off mechanisms of two steam-engines, the generators driven by such engines, and means for controlling the cut-off mechanisms electrically, embodying my invention, the parts being shown separated for clearness.

A and B are two dynamo or magneto electric machines, which are connected with and feed into the same conductors, 1 2, or system of conductors. These generators are preferably connected with the conductors 1 2 in multiple arc, although they may be arranged in series or multiple series. The field-circuit 3 4 of each generator is provided with an adjustable resistance, R, to vary the electro-motive force of the machine, as required by the addition or removal of translating devices.

C D represent portions of the cut-off mechanisms of two steam-engines. The shafts $a$ of the engines are coupled directly or connected by belting with the shafts of the generators, or each engine may operate two or more generators. The lever $b$, which adjusts the cut-off, is connected by a rod with a crank-pin or eccentric sleeve, $c$, on a shaft, $d$, provided with a worm-wheel engaging a worm, $e$, on the spindle of an electro-dynamic motor. Two of these motors, E F, are shown, one for each engine. Each motor has two armatures, $f g$, with reverse windings or connections, and two commutators, $h i$, the two armatures having a common field-magnet, $k$.

G is a controlling electro-magnet, located in a multiple-arc circuit, 5 6, from 1 2, and affected the same as the lamps, motors, or other translating devices H, which are also arranged in multiple arc. The armature-lever $l$ of this magnet is provided with an adjustable retractor, $m$, and is centered between two springs, $n$.

The circuit of the motors is from conductor 1, by conductor 7, to the lever $l$. At the front and back contacts, $o p$, of this lever the circuit is divided, one branch, 8, passing through the armatures $f$, and the other branch, 9, through the armatures $g$. At the last machine the circuit is again through one conductor, 10, which returns through the field-magnets of all the motors, and is connected with the conductor 2. At each motor is a switch, $q$, which completes the field-magnet circuit in one position, and in its other position breaks such magnet-circuit and completes another circuit, 11, having a resistance equal to that of the field-magnet. When lever $l$ makes contact $o$ the armatures $f$ will receive current; but when $l$ makes contact $p$ the armatures $g$ receive the current. In a central position the lever $l$ breaks both branches of the circuit through the motors. When any one of the engines is stopped, the switch $q$ of the governor-motor of the engine is moved to break the field-circuit and complete circuit 11, or the motor may be disconnected mechanically from the engine.

These electrical governors, controlled from the same circuit, and that circuit the one into which all the generators feed, maintain a uniform speed of the engines, and prevent the racing of the engines, and the conversion of part of the generators into motors, which occur when the engines are controlled by separate and independent mechanisms.

What I claim is—

1. The combination, with two or more independent engines and dynamo or magneto electric machines operated thereby and feeding into the same conductors, of governors for such engines and means for electrically controlling said governors simultaneously, substantially as set forth.

2. The combination, with two or more independent engines and dynamo or magneto electric machines operated thereby and feeding into the same conductors, of governors for such engines and means connected with the circuit supplied by the generators for electrically controlling such governors simultaneously, substantially as set forth.

3. The combination, with two or more independent engines and dynamo or magneto electric machines operated thereby and feeding into the same conductors, of governors for such engines, means for operating such governors electrically, and means connected with the circuit supplied by the generators for electrically controlling such governors simultaneously, substantially as set forth.

4. The combination, with two or more independent engines and dynamo or magneto electric machines operated thereby and feeding into the same conductors, of governors for such engines, means for operating such governors electrically, energized from the same circuit, and means connected with the circuit supplied by the generators for closing reverse circuits through all of such governor-operating devices, whereby the electrical governors are caused to move in one or the other direction simultaneously, as required, substantially as set forth.

5. The combination, with the independent engines, of the motors with two armatures connected with the throttle-valves or cut-offs of the engines, and the electro-magnet controlling all of the motors, substantially as set forth.

6. The combination, with the independent engines, of the electrical governors, means for electrically controlling such governors simultaneously, and means for throwing any one of the governors out of operation without affecting the action of the other governors, substantially as set forth.

7. The combination, with two or more independent engines and dynamo or magneto electric machines operated thereby and feeding into the same conductors, of means for varying the electro-motive force of the generators, as required by the addition or removal of translating devices, and means for electrically controlling the throttle-valves or cut-off mechanisms of the engines simultaneously, substantially as set forth.

This specification signed and witnessed this 19th day of October, 1882.

THOS. A. EDISON.

Witnesses:
 H. W. SEELY,
 E. H. PYATT.